United States Patent
Ljungblad

(10) Patent No.: US 11,534,963 B2
(45) Date of Patent: Dec. 27, 2022

(54) RADIATION METHOD FOR ADDITIVE MANUFACTURING

(71) Applicant: Freemelt AB, Mölndal (SE)

(72) Inventor: Ulric Ljungblad, Mölndal (SE)

(73) Assignee: Freemelt AB, Mölndal (SE)

( * ) Notice: Subject to any disclaimer, the term of this patent is extended or adjusted under 35 U.S.C. 154(b) by 71 days.

(21) Appl. No.: 17/041,483

(22) PCT Filed: Mar. 26, 2019

(86) PCT No.: PCT/EP2019/057613
§ 371 (c)(1),
(2) Date: Sep. 25, 2020

(87) PCT Pub. No.: WO2019/185642
PCT Pub. Date: Oct. 3, 2019

(65) Prior Publication Data
US 2021/0122107 A1    Apr. 29, 2021

Related U.S. Application Data

(60) Provisional application No. 62/648,498, filed on Mar. 27, 2018.

(51) Int. Cl.
| | |
|---|---|
| *B29C 64/153* | (2017.01) |
| *B29C 64/277* | (2017.01) |
| *B29C 64/286* | (2017.01) |
| *B29C 64/273* | (2017.01) |
| *B29C 64/188* | (2017.01) |
| *B29C 64/30* | (2017.01) |

(Continued)

(52) U.S. Cl.
CPC .......... *B29C 64/153* (2017.08); *B29C 64/188* (2017.08); *B29C 64/273* (2017.08); *B29C 64/277* (2017.08); *B29C 64/286* (2017.08); *B29C 64/30* (2017.08); *B33Y 40/00* (2014.12); *B33Y 10/00* (2014.12)

(58) Field of Classification Search
CPC .... B29C 64/153; B29C 64/188; B29C 64/277
See application file for complete search history.

(56) References Cited

U.S. PATENT DOCUMENTS 8,879,957 B2 * 11/2014 Hanson ................. B33Y 30/00
399/130
9,162,393 B2   10/2015 Ackelid
(Continued)

FOREIGN PATENT DOCUMENTS

| EP | 2 937 163 B1 | 5/2017 |
| EP | 3 269 473 A1 | 1/2018 |
| EP | 3363564 A1 * | 8/2018 | ............ B22F 3/1055 |

*Primary Examiner* — Atul P. Khare
(74) *Attorney, Agent, or Firm* — Faegre Drinker Biddle & Reath LLP

(57) ABSTRACT

A method for manufacturing a three-dimensional object by solidifying selected areas of consecutive powder layers is provided. At least one electron beam successively irradiates predetermined sections of each powder layer by moving an interaction region in which the electron beam interacts with the powder layer. Electromagnetic radiation from a radiation source is directed onto the powder layer to reduce local electrostatic charging in the interaction region. In this way, levitation and scattering of charged powder will be avoided.

16 Claims, 2 Drawing Sheets

(51) Int. Cl.
*B33Y 40/00* (2020.01)
*B33Y 10/00* (2015.01)

(56) References Cited

U.S. PATENT DOCUMENTS

| | | | |
|---|---|---|---|
| 9,452,489 B2 * | 9/2016 | Honda | B23K 15/004 |
| 9,468,973 B2 * | 10/2016 | Ljungblad | B22F 3/1035 |
| 9,676,031 B2 * | 6/2017 | Ljungblad | B23K 15/00 |
| 9,844,913 B2 * | 12/2017 | Bessac | B33Y 10/00 |
| 10,105,902 B2 * | 10/2018 | Frauens | G03G 15/00 |
| 10,500,834 B2 * | 12/2019 | Furukawa | B33Y 10/00 |
| 10,723,076 B2 * | 7/2020 | Chanclon Fernandez | B29C 64/255 |
| 2013/0077996 A1 | 3/2013 | Hanson et al. | |
| 2018/0079003 A1 * | 3/2018 | Lin | B23K 26/046 |

* cited by examiner

RADIATION METHOD FOR ADDITIVE MANUFACTURING

CROSS-REFERENCE TO PRIOR APPLICATIONS

This application is a § 371 National Stage Application of PCT International Application No. PCT/EP2019/057613 filed Mar. 26, 2019, which claims priority to U.S. Provisional Application No. 62/648,498 filed on Mar. 27, 2018, both of which are incorporated herein in their entirety.

TECHNICAL FIELD

This invention relates to a method for producing a three dimensional object by fusing or solidifying layer by layer of a powder material by means of an electron beam.

DESCRIPTION OF RELATED ART

In prior art additive manufacturing systems, or 3D printing systems, based on electron beam powder bed fusion, there is a potential problem with electrostatically charged powder grains repelling each other.

When the electron beam interacts with the powder bed during the manufacturing process, there will be a large number of electrons charging the powder grains in the powder bed. If the electrical conductivity of the powder bed is too low to efficiently dissipate such electric charge induced by the electron beam, then the powder bed will accumulate charge to reach a critical state where repelling electrostatic forces between the powder grains exceed gravitational forces, causing the powder grains to levitate from the powder bed. Levitated charged powder grains will repel from other levitated charged powder grains and from the powder bed, and thus a powder cloud will rapidly form and scatter throughout the manufacturing chamber. This phenomenon, electrostatic levitation of powder, usually leads to an immediate failure and termination of the additive manufacturing process.

In U.S. Pat. No. 9,162,393 B2, a method for producing three-dimensional objects is described where gas is introduced for producing ions. Further, the document EP 2937163 B1 describes a machine and method where static electricity is eliminated from powder using a second tilted electron beam.

SUMMARY OF THE INVENTION

This invention relates to a method for manufacturing a three-dimensional object by solidifying selected areas of consecutive powder layers, where at least one electron beam successively irradiates predetermined sections of each powder layer by moving an interaction region in which the electron beam interacts with the powder layer, wherein electromagnetic radiation from a radiation source is directed onto the powder layer to reduce electrostatic charge in the interaction region.

In embodiments, said electromagnetic radiation is directed onto the powder layer simultaneously as the electron beam irradiates the interaction region.

In embodiments, said electromagnetic radiation is directed onto the powder layer simultaneously as the electron beam irradiates the interaction region without solidifying the interaction region.

In embodiments, the radiation source is a laser.

In embodiments, the radiation source is a pulsed laser.

In embodiments, the radiation source is emitting electromagnetic radiation in the ultraviolet wavelength region.

In embodiments, the radiation source is an ultraviolet-lamp.

In embodiments, the radiation source is emitting electromagnetic radiation in the X-ray wavelength region.

In embodiments, the radiation source is emitting electromagnetic radiation with photon energies higher than the work function of the material in the powder layer.

In embodiments, the radiation source continuously directs electromagnetic radiation onto the powder layer simultaneously as the at least one electron beam interacts with the powder layer.

In embodiments, the electromagnetic radiation is directed onto the powder layer by reflections from surfaces surrounding the powder layer.

In embodiments, the electromagnetic radiation is irradiating a selected subset area of the powder layer overlapping the interaction region.

In embodiments, the selected subset area is moved for continuous overlap with the interaction region.

In embodiments, at least one electrical conductor is positioned in a vicinity of the powder bed to capture electrons emitted from the powder bed by the photoelectric effect caused by the electromagnetic radiation.

In embodiments, a moveable shutter is provided in front of the radiation source.

In embodiments, the electromagnetic radiation from said radiation source is reflected from a reflector towards the powder layer.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

In the description of the invention references is made to the following figures, in which.

Embodiments of the present disclosure and their advantages are best understood by referring to the detailed description that follows. It should be appreciated that like reference numerals are used to identify like elements illustrated in one or more of the figures.

DESCRIPTION AND DISCLOSURE OF THE INVENTION

Figure 1:
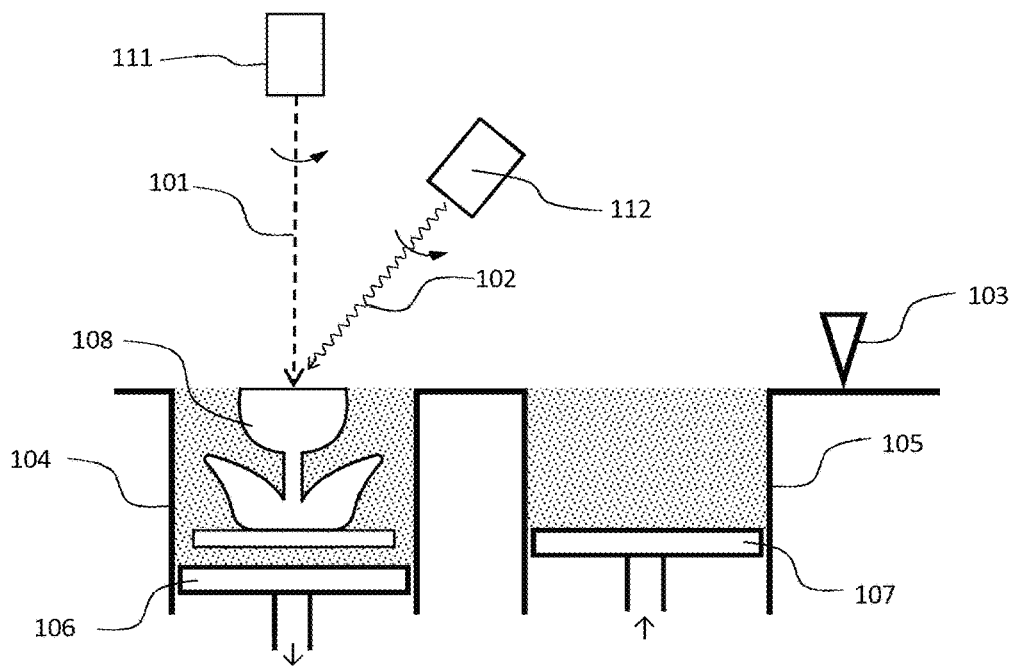
FIG. 1 shows, in schematic section view, a powder feeding and a build chamber radiated by a beam from radiation source.

Additive manufacturing and 3D printing refer to the process of manufacturing objects from 3D model data by joining materials layer upon layer. Powder bed fusion means additive manufacturing or 3D printing where objects are built up in a powder bed. Thin layers of powder are repeatedly spread over a powder bed and fused by a beam from an energy source to a predetermined geometry for each layer. The energy source can be for example a laser or an electron gun. Upon finishing a powder bed fusion process, the fused object will be embedded in powder. The powder is removed after completion of the build.

Electron beam powder bed fusion takes place in vacuum, and the electron beam may operate in several process steps: it may preheat the powder layers to a semi-sintered state, it may melt or solidify the powder layers, and it may add additional heat to the powder bed to maintain a predetermined temperature of the powder bed throughout the build. These process steps are carried out under computer control to achieve predetermined quality requirements of the manufactured objects.

The purpose of this invention is to provide an improved method for preventing unwanted electrostatic charging of the powder bed in an additive manufacturing process. Levitation and scattering of charged powder particles will be avoided.

This invention is based on the understanding that electromagnetic radiation is able to excite and remove electrons from a material. Electromagnetic radiation includes radio waves, microwaves, infrared, visible light, ultraviolet, x-rays and gamma rays.

The work function of a material is the minimum energy required to remove an electron from the surface of the material. If the photon energy of the electromagnetic radiation exceeds the work function of the irradiated material, electrons will absorb the photon energy and escape from the surface of the material. It is desirable that the photon energy is higher than the work function of the material, since there will then be excess energy providing velocity to the electrons leaving the surface. This phenomenon is known as the "photoelectric effect" and the emitted electrons are called "photoelectrons".

The common range of work function for metallic materials is between 3 eV and 6 eV (where eV=electronvolt). The work function is associated with loosely bound conduction electrons in the metal. Photoemission of strongly bound core electrons is also possible, provided that a higher photon energy is used. The binding energy of core electrons is typically from 20 eV up to several keV.

Visible light has energy between 1.6 eV and 3.3 eV, corresponding to wavelengths from 780 nm down to 380 nm. Ultraviolet light has energy between 3.3 eV and 120 eV, corresponding to wavelengths from 380 nm down to 10 nm. Soft x-rays have energy between 120 eV and 12 keV, corresponding to wavelengths from 10 nm down to 0.1 nm. Consequently, ultraviolet light and soft x-rays have sufficient energy for photoelectron emission from metallic materials.

In addition to charge neutralization by photoelectron emission, electromagnetic radiation may also cause another effect preventing levitation of powder grains in the powder bed. Many types of metal powders have a thin layer of a native surface contamination, typically a native oxide, on the surface of the powder grains. For example, aluminium alloys and titanium alloys always have a native oxide when having been exposed to air. The surface contamination layer may have lower electrical conductivity than the underlying metal, and the surface contamination may even have semiconducting properties. For example, titanium dioxide is a semiconductor known to have a bandgap of approximately 3 eV. Electromagnetic radiation can increase the electrical conductivity of semiconductors by exciting electrons from the valence band to the conduction band, so-called electron-hole pair generation, provided that the photon energy exceeds the bandgap of the semiconductor. For example, ultraviolet light with a photon energy larger than 3 eV may generate electron-hole pairs and increase the electrical conductivity of titanium dioxide.

In cases where electromagnetic radiation increases the electrical conductivity of the native surface contamination layer on metal powder grains, the powder bed will be able to dissipate electric charge better than without irradiation by electromagnetic radiation. This means that electrostatic levitation and scattering of powder will be avoided.

This invention is based on the fact that negative charge created in a powder bed by an electron beam can be balanced out by positive charge created by photoelectron emission and by an increase in conduction of electrons in the powder bed.

The powder bed in an electron beam additive manufacturing process can be divided into different areas; a first area where powder is solidified, or melted, to a dense material; a second area where powder is semi-sintered, this area is usually in a vicinity of the first area; a third area of loose powder, usually outside the second semi-sintered area.

In the interaction region between the electron beam and the powder bed, the electron beam can perform semi-sintering or fusing of the powder in the additive manufacturing process. One purpose of semi-sintering the powder is to increase the thermal and electrical conduction of the powder bed. Another purpose is to add heat to the powder bed in a hot process. When powder is semi-sintered, the powder grains will be connected and agglomerated to each other resulting in that the powder will be prevented from electrostatic levitation.

The interaction region, or area, where the powder is irradiated by the electron beam is where many electrons are added from the electron beam. The interaction region can also be described as the area or volume where the electron beam hits the powder bed. The problem with electrostatic levitation of powder can occur in either of the first, second or third areas. It is therefore advantageous to illuminate or irradiate either or all of the three areas with electromagnetic radiation.

In the additive manufacturing process cycle, the electron beam interacts with the first and the second area, but not with the third area. Since the electron beam does not interact with the third area, the powder in this area will be less charged; on the other hand this area will contain loose powder typically having a lower electrical conductivity than melted and sintered powder. To prevent the loose powder in the third area from being charged, it would be advantageous to irradiate also this area by electromagnetic radiation, to avoid it scattering due to charging caused not directly by the electron beam but rather by secondary electron dispersion of electrons such as backscatter electrons or secondary emission electrons from the interaction region. In the first and the second area, the powder grains will be joined together by semi-sintering, but also more extensively charged by the electron beam. Hence, it is of importance to reduce charges in all three areas by electromagnetic radiation.

The purpose of this invention is to electrically neutralize the powder bed or at least reduce the charging of the powder bed. This can be performed preventive before the electron beam interacts with the powder or simultaneously with the electron beam interacting with the powder bed. It is also possible to use the invention as a proactive measure in situations with risk for unwanted scattering, or remedy when scattering already has started to occur. The radiation source can also be used during a manufacturing process step for irradiating the powder layer simultaneously as the electron beam irradiates the interaction region, without solidifying the interaction region.

Using electromagnetic radiation for charge neutralization in the powder bed will not affect the beam size and not reduce the resolution of the electron beam. Other advantages of this invention is that there is no need for a second electron beam source, such as described in EP 2937163 B1, that can interfere with the main electron beam source or just constitute an additional complication and cost to the 3D printing system.

Furthermore, in contrast to U.S. Pat. No. 9,162,393 B2 where inert gas is introduced into the manufacturing chamber, the present invention makes it possible to maintain a high vacuum inside the manufacturing chamber. This is beneficial for the chemical purity of the manufactured three-dimensional object and it also reduces the consumption of expensive inert gas. A high vacuum is also beneficial for the lifetime of sensitive components in the electron gun, such as the cathode.

With the present invention, it is possible to reduce excess electrons in vicinity of the electron beam interaction region, but also over the entire powder bed and surrounding machine components to achieve a stable environment for the manufacturing process.

When electrostatic levitation of powder is eliminated, it is possible to use an electron beam with higher energy density, higher or lower beam translation speed over the powder bed and more energy over the entire powder bed, resulting in shorter manufacturing time and lower cost of manufactured components. It will thus also be possible to achieve an overall faster build speed for components.

When electrostatic levitation is avoided, it is possible to directly solidify loose powder, which can provide a better efficiency of the process. This means that a larger fraction of the beam power can be used for melting powder into a component and less beam power would consequently be wasted for heating of powder surrounding the component.

Figure 3:
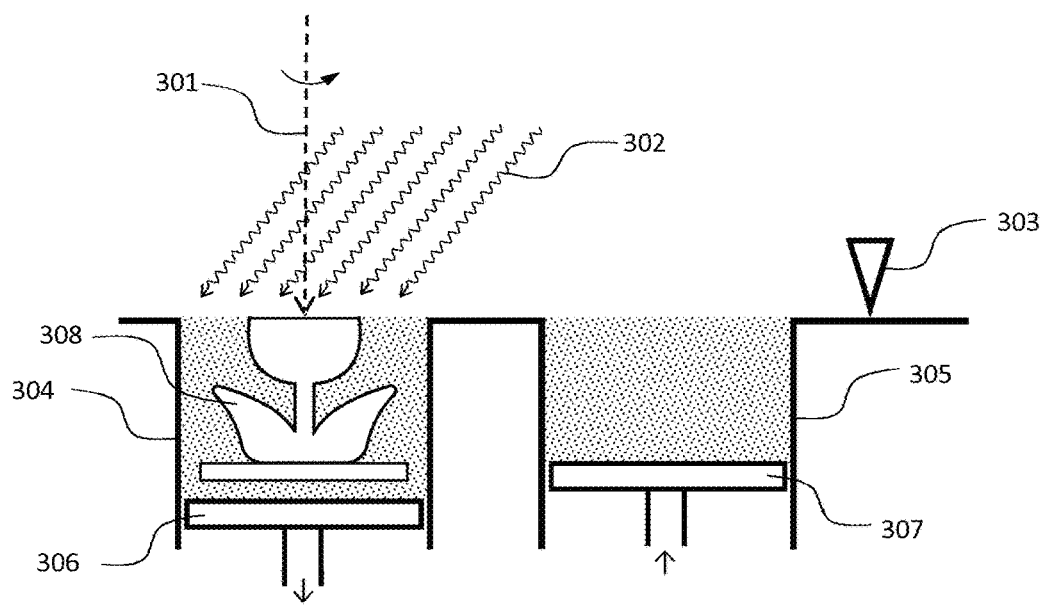
FIG. 3 shows, in schematic section view, a powder feeding and a build chamber radiated by a radiation source.
Figure 4:
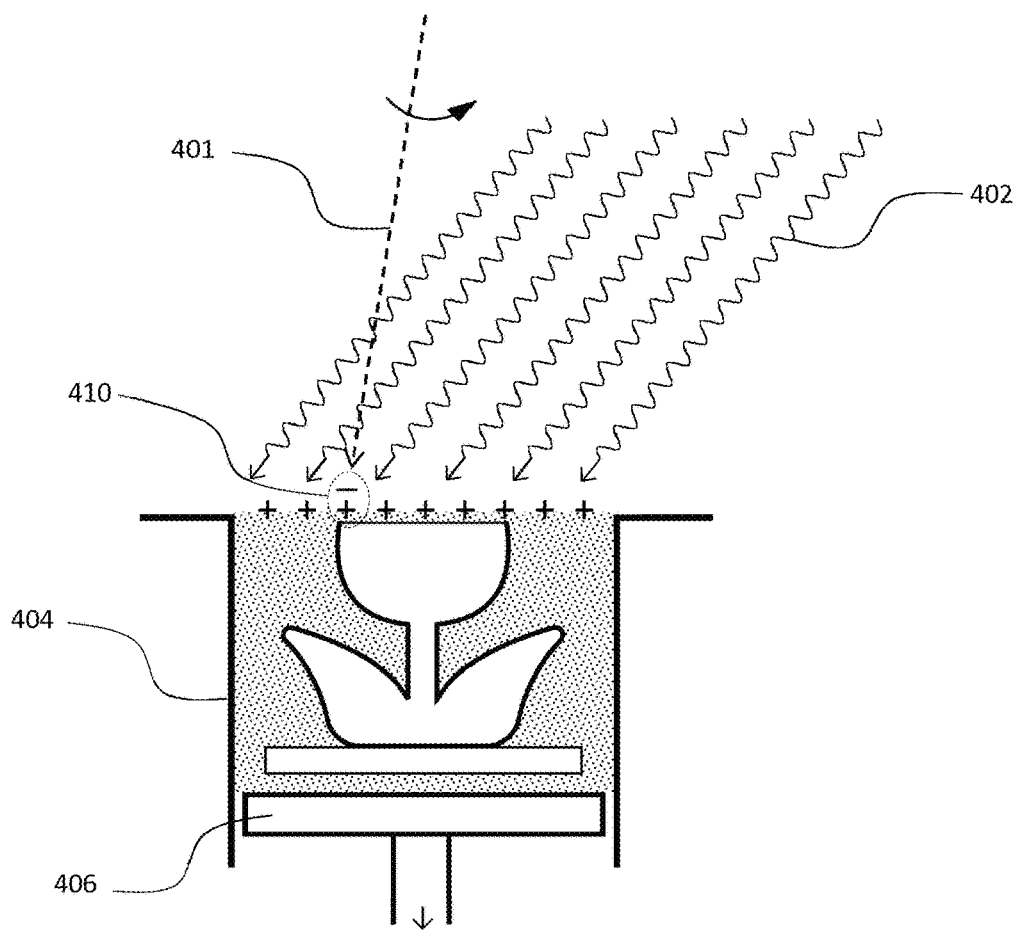
FIG. 4 shows, in schematic section view, a build chamber radiated by a radiation source.

In an embodiment, shown in FIG. 3, an electron source provides an electron beam 301 for melting powder in a powder layer for manufacturing an object 308. Said powder layer is distributed on top of a powder bed in a manufacturing container 304 inside a vacuum chamber. A powder distributor 303 is provided for distributing powder from a powder region in a powder container 305 to a manufacturing region in said manufacturing container 304. Furthermore, a light source is provided for illuminating or irradiating the manufacturing region with ultraviolet light 302 over the entire powder bed, for at least partly cancelling negative charge at the powder layer, thereby avoiding levitation of powder. The radiation source continuously directs electromagnetic radiation 302 onto the powder layer at the manufacturing container 304 during irradiation of the powder layer by the electron beam 301. In FIG. 4 is shown how negative charge, generated from the electron beam 401, is at least partly cancelled 410 in the interaction region by positive charge generated at the powder bed by ultraviolet light 402 from the radiation source.

Figure 2:
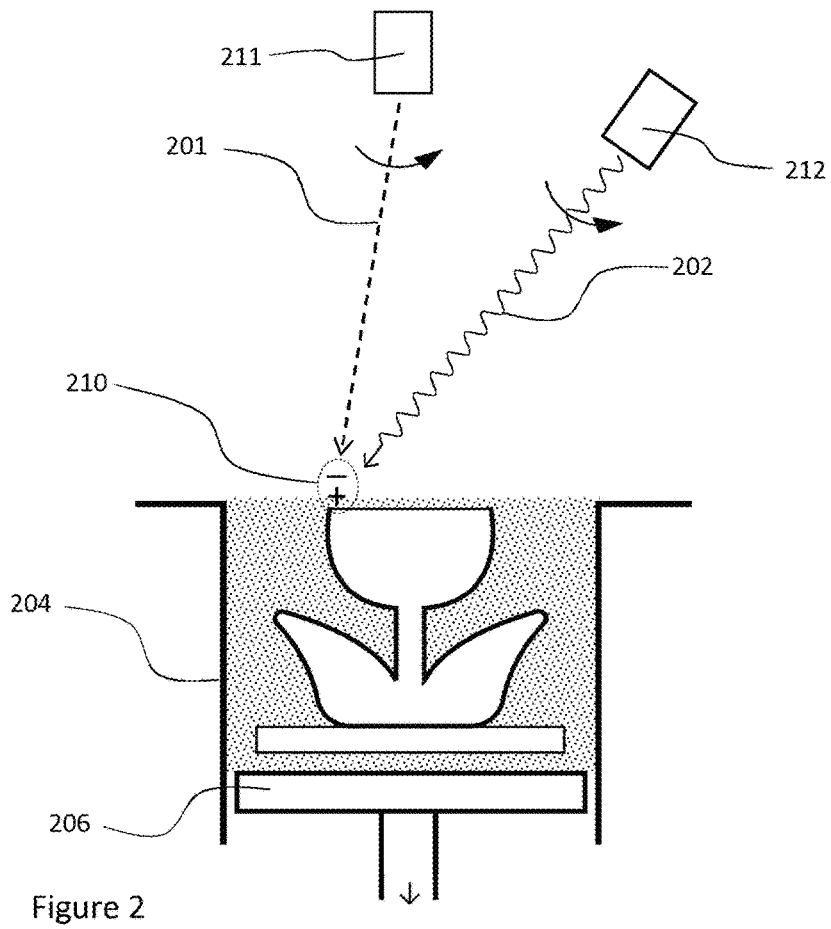
FIG. 2 shows, in schematic section view, a build chamber radiated by a beam from a radiation source.

Another embodiment of the invention is shown in FIG. 1, with a powder distributor 103 and an electron beam 101, from an electron source 111, for manufacturing of an object 108. Electromagnetic radiation 102, from a radiation source, is following said electron beam 101 during the manufacturing process for instantly cancelling charges in the interaction region for reducing electrostatic charging in the interaction region. In FIG. 2 is shown how negative charge from the electron beam 201, from an electron source 211, is continuously cancelled 210 by positive charge generated by electromagnetic radiation 202, from a radiation source 212. The moving electromagnetic radiation 202 is synchronized with the moving electron beam 201 for reducing the risk for electrostatic charging of the powder bed.

The manufacturing region can be divided into; a first area where powder is fused, or solidified to a dense material; a second area where powder is semi-sintered, usually in a vicinity of the first area; a third area of loose powder, usually outside the second sintered area. The radiation source can be placed outside the vacuum chamber with the radiation radiating through a window transparent for the used wavelength, for example made of magnesiumflorid, synthetic quartz or sapphire. The radiation source does not necessarily need free line-of-sight to the powder bed, since for instance ultraviolet light will be reflected and spread by metal surfaces inside the vacuum chamber. The radiation can be directed onto the powder layer by reflections from surfaces surrounding the powder layer, so called indirect radiation onto the powder layer.

The radiation source can typically be started before the electron beam is switched on, for use during the whole process of preheating, fusing and distribution of powder. The radiation source can be switched off when the melting and heating process has finished and after the electron beam has been switched off.

The radiation source can typically be a laser, pulsed laser, ultraviolet-lamp or x-ray source. The used electromagnetic radiation can be chosen in the ultraviolet wavelength region. It is also possible to use electromagnetic radiation in the x-ray wavelength region. To reduce the risk for levitation and scattering of charged powder in the most efficient way, the intensity and energy level of the electromagnetic radiation can be varied to maintain constant process condition at the powder bed.

In yet another embodiment, the electromagnetic radiation is irradiating a selected subset area of the powder layer overlapping the interaction region for concentration of the charge cancellation effect to the region where the electron beam interacts with the powder bed. It is also possible to make such subset area follow the interacting region between the electron beam and the powder bed. This is done by moving the radiated selected subset area of the powder bed for continuously overlapping with the interaction region by the electromagnetic radiation.

In further embodiments, there can be a moveable shutter provided between the window in front of the ultraviolet light source and the powder bed as a protection, to prevent vaporized material from the powder bed to coat and obscure the window during one or several of the processing steps. Alternatively, the ultraviolet light can be reflected from a reflector in the vacuum chamber towards the powder bed, thus protecting the window in front of the ultraviolet source by placing it away from direct line of sight from the processing region. The reflector can be combined with a heat shield, which can be made of aluminium that has high reflectance in the ultraviolet wavelength range.

In yet another embodiment, at least one electrical conductor can be positioned in a vicinity of the powder bed to attract and capture electrons emitted from the powder bed by the photoelectric effect caused by the electromagnetic radiation.

The object of this invention is to provide a method for avoiding levitation and scattering of charged powder. This object is achieved by the method defined in the independent claim. The dependent claims contain advantageous embodiments, variants and further developments of the invention.

What is claimed is:

1. A method for manufacturing a three-dimensional object by solidifying selected areas of consecutive powder layers, where at least one electron beam successively irradiates predetermined sections of each of the powder layers by moving an interaction region in which the at least one electron beam interacts with the powder layers, and wherein electromagnetic radiation from a radiation source is directed onto the powder layers to reduce electrostatic charge in the interaction region by exciting and removing electrons from the powder layers, thereby causing photoeletron emission from the interaction region.

2. The method according to claim 1, wherein said electromagnetic radiation is directed onto the powder layers simultaneously as the at least one electron beam irradiates the interaction region.

3. The method according to claim 1, wherein said electromagnetic radiation is directed onto the powder layers simultaneously as the at least one electron beam irradiates the interaction region without solidifying the interaction region during a preheating step.

4. The method according to claim 1, wherein the radiation source is a laser.

5. The method according to claim 1, wherein the radiation source is a pulsed laser.

6. The method according to claim 1, wherein the radiation source is emitting said electromagnetic radiation in the ultraviolet wavelength region.

7. The method according to claim 1, wherein the radiation source is an ultraviolet lamp.

8. The method according to claim 1, wherein the radiation source is emitting said electromagnetic radiation in the X-ray wavelength region.

9. The method according to claim 1, wherein the radiation source is emitting said electromagnetic radiation with photon energies higher than the work function of material in the powder layers.

10. The method according to claim 1, wherein the radiation source continuously directs said electromagnetic radiation onto the powder layers simultaneously as the at least one electron beam interacts with the powder layers.

11. The method according to claim 1, wherein the electromagnetic radiation is directed onto the powder layers by reflections from surfaces surrounding the powder layers.

12. The method according to claim 1, wherein the electromagnetic radiation is irradiating a selected subset area of the powder layers overlapping the interaction region.

13. The method according to claim 12, wherein the selected subset area that is being irradiated is moved for continuous overlap with the interaction region.

14. The method according to claim 1, wherein at least one electrical conductor is positioned in a vicinity of the powder layers to capture electrons emitted from the powder layers by the photoelectric effect caused by the electromagnetic radiation.

15. The method according to claim 1, wherein a moveable shutter is provided in front of the radiation source.

16. The method according to claim 1, wherein the electromagnetic radiation from said radiation source is reflected from a reflector towards the powder layers.

* * * * *